US012632522B2

(12) United States Patent
Christodorescu et al.

(10) Patent No.: US 12,632,522 B2
(45) Date of Patent: May 19, 2026

(54) ADAPTIVE RECOVERY FOR DIGITAL IDENTITY PLATFORM

(71) Applicant: Visa International Service Association, San Francisco, CA (US)

(72) Inventors: Mihai Christodorescu, Belmont, CA (US); Sunpreet Singh Arora, Union City, CA (US); Maliheh Shirvanian, Cupertino, CA (US)

(73) Assignee: Visa International Service Association, San Francisco, CA (US)

( * ) Notice: Subject to any disclaimer, the term of this patent is extended or adjusted under 35 U.S.C. 154(b) by 116 days.

(21) Appl. No.: 18/691,219

(22) PCT Filed: Sep. 20, 2021

(86) PCT No.: PCT/US2021/051133
§ 371 (c)(1),
(2) Date: Mar. 12, 2024

(87) PCT Pub. No.: WO2023/043465
PCT Pub. Date: Mar. 23, 2023

(65) Prior Publication Data
US 2024/0378271 A1     Nov. 14, 2024

(51) Int. Cl.
*G06F 21/31*     (2013.01)
*H04L 9/08*     (2006.01)
*H04L 9/40*     (2022.01)

(52) U.S. Cl.
CPC ............ *G06F 21/31* (2013.01); *H04L 9/0894* (2013.01); *H04L 63/0861* (2013.01)

(58) Field of Classification Search
CPC .... G06F 21/31; H04L 9/0894; H04L 63/0861
See application file for complete search history.

(56) References Cited

U.S. PATENT DOCUMENTS

| | | | |
|---|---|---|---|
| 8,819,810 B1 * | 8/2014 | Liu ....................... | H04L 9/3226 |
| | | | 726/18 |
| 9,455,974 B1 | 9/2016 | Ames et al. | |
| 10,255,419 B1 * | 4/2019 | Kragh .................... | H04L 9/321 |
| 10,432,605 B1 | 10/2019 | Lester et al. | |

(Continued)

OTHER PUBLICATIONS

PCT/US2021/051133 , "International Search Report and Written Opinion", Jun. 10, 2022, 11 pages.

(Continued)

*Primary Examiner* — Shanto Abedin
(74) *Attorney, Agent, or Firm* — Kilpatrick Townsend & Stockton LLP

(57)     ABSTRACT
A method, performed by a digital identity computer, for processing a resource request is disclosed. The method includes receiving, from a user device operated by a user, a resource request and indication of identity attributes needed to process the resource request. The digital identity computer may then retrieve an identity token associated with the user and compute an authentication score based on the sensitivity and rarity of the identity attributes indicated. The authentication score can be used to determine an authentication process. After determining and executing the authentication process with the user device, the digital identity computer may then grant the user device access to the resource requested.

20 Claims, 6 Drawing Sheets

(56) References Cited

U.S. PATENT DOCUMENTS

| | | | |
|---|---|---|---|
| 2012/0060207 A1* | 3/2012 | Mardikar ................ | H04L 63/20 |
| | | | 726/4 |
| 2013/0198824 A1 | 8/2013 | Hitchcock et al. | |
| 2014/0173754 A1* | 6/2014 | Barbir ................ | H04L 63/0815 |
| | | | 726/28 |
| 2014/0283097 A1* | 9/2014 | Allen .................. | G06F 21/6254 |
| | | | 726/26 |
| 2015/0332029 A1* | 11/2015 | Coxe ....................... | G06F 21/31 |
| | | | 726/5 |
| 2016/0087957 A1 | 3/2016 | Shah | |
| 2017/0070510 A1* | 3/2017 | Ramalingam ........... | H04L 63/08 |
| 2018/0227288 A1 | 8/2018 | Zhu et al. | |
| 2019/0036904 A1 | 1/2019 | Greenspan et al. | |
| 2019/0392447 A1* | 12/2019 | Hutchinson ............ | G06Q 40/00 |
| 2020/0014702 A1 | 1/2020 | Dasgupta et al. | |
| 2020/0322342 A1* | 10/2020 | Gokhale ............... | H04L 63/108 |
| 2020/0372149 A1 | 11/2020 | Di Pietro et al. | |
| 2021/0168148 A1 | 6/2021 | Boodaei et al. | |
| 2021/0194883 A1* | 6/2021 | Badhwar .............. | H04L 63/107 |

OTHER PUBLICATIONS

R. J. Hulsebosch, Mortaza S. Bargh, Gabriele Lenzini, P. W. G. Ebben, Sorin M. Iacob: Context Sensitive Adaptive Authentication. EuroSSC 2007: 93-94 (2 pages).
Mainali P., Shepherd C., and Petitcolas F., 2019. Privacy-enhancing context authentication from location-sensitive data. In Proceedings of the international Conference on Availability, Reliability, and Security (ARES'19). ACM, New York, NY, Article 87, 10 pages.
EP21957701.2 , "Extended European Search Report", Oct. 22, 2024, 10 pages.

\* cited by examiner

IDENTITY TABLE
300

| ATTRIBUTE | SENSITIVITY | RARITY | VALUE |
|---|---|---|---|
| NAME | LEVEL 1 | LOW | JOHN SMITH |
| DOB | LEVEL 2 | LOW | 01-01-1970 |
| ACCOUNT NUMBER | LEVEL 3 | HIGH | 0000 1234... |
| ADDRESS | LEVEL 1 | MEDIUM | CA, USA |

FIG. 3

ADAPTIVE RECOVERY FOR DIGITAL IDENTITY PLATFORM

CROSS-REFERENCES TO RELATED APPLICATIONS

This application is the National Stage of International Application No. PCT/US2021/051133, filed Sep. 20, 2021, of which is herein incorporated by reference in its entirety.

BACKGROUND

Identity checks are performed in many situations. For example, a user purchasing age-restricted goods (e.g., alcohol) from a resource provider such as a merchant may be required to present their government issued ID card as an identity check. If the user is not old enough to purchase the age-restricted good, the resource provider will not provide the age-restricted good to the user.

In some systems, the user may have a digital identity token in order to complete an identity check. The digital identity token may contain sensitive data of the user (e.g., name, date of birth, address, phone numbers, account numbers, etc.). It can be provided to the resource provider instead of a physical ID, such as a government issued ID card. As the identity token contains sensitive data, it needs to be protected when it is stored in association with a digital identity account in a digital identity platform.

In some cases, the user may use a public-private key pair in association with the digital identity account associated with the digital identity token. The private key may be stored on the user's user device (e.g., the user's phone) and can be used to decrypt data or sign data in processes involving the use of the identity token. The data that is being decrypted may have been previously encrypted with a public key corresponding to the private key. In some cases, the private key may be stored in a wallet on the user's user device. The user's use of the private key (e.g., such as when the user's user device uses the private key to sign data) can be proof of the user's authority to use the digital identity token. Other schemes may use symmetric cryptographic keys instead of asymmetric keys as noted above.

In some instances, the user may not be able to access their digital identity account. For example, the user can lose access to their digital wallet which stores the user's private key. The user will then have to contact the digital identity platform to recover the user's digital identity account and possibly re-register with the digital identity platform so that a new public-private key pair can be generated or the original private key is recovered. While account recovery techniques are known, they can involve multiple elaborate steps resulting in friction for the user. For instance, a user may be asked to supply a large number of credentials to prove that they are the legitimate account owner. In such cases, the user may be frustrated and may not even be able to recover the account if the proof requirements are too stringent.

Embodiments of the disclosure address this problem and other problems individually and collectively.

SUMMARY

One embodiment of the invention includes a method. The method comprises: receiving, by a digital identity computer from a user device operated by a user, a resource request; retrieving, by the digital identity computer, an identity token comprising a plurality of attributes associated with the user;

determining, by the digital identity computer, an authentication score based on at least sensitivity scores and rarity scores for the attributes in the identity token; determining, by the digital identity computer, an authentication process from a plurality of authentication processes using the authentication score; in response to determining the authentication process, executing, by the digital identity computer, the authentication process with the user; and after authenticating the user, continuing processing the resource request.

Another embodiment of the invention is related to a digital identity computer. The digital identity computer comprises: a processor; and a non-transitory computer readable medium comprising code executable by the processor for performing a method comprising: receiving, by a digital identity computer from a user device operated by a user, a resource request; retrieving, by the digital identity computer, an identity token comprising a plurality of attributes associated with the user; determining, by the digital identity computer, an authentication score based on at least sensitivity scores and rarity scores for the attributes in the identity token; determining, by the digital identity computer, an authentication process from a plurality of authentication processes using the authentication score; in response to determining the authentication process, executing, by the digital identity computer, the authentication process with the user; and after authenticating the user, continuing processing the resource request.

Yet another embodiment of the invention includes a method. The method comprises: transmitting, by a user device operated by a user to a digital identity computer, a resource request, wherein the digital identity computer determines an authentication process for the resource request by determining an authentication score based on sensitivity scores and rarity scores for an identity token comprising attributes associated with the user; receiving, by the user device from the digital identity computer, instructions to complete the authentication process; and executing, by the user device, the authentication process.

A better understanding of the nature and advantages of embodiments of the invention may be gained with reference to the following detailed description and accompanying drawings.

BRIEF DESCRIPTION OF THE DRAWINGS

FIG. 3 shows a block diagram of an identity table according to embodiments of the invention.

DETAILED DESCRIPTION

Figure 1:
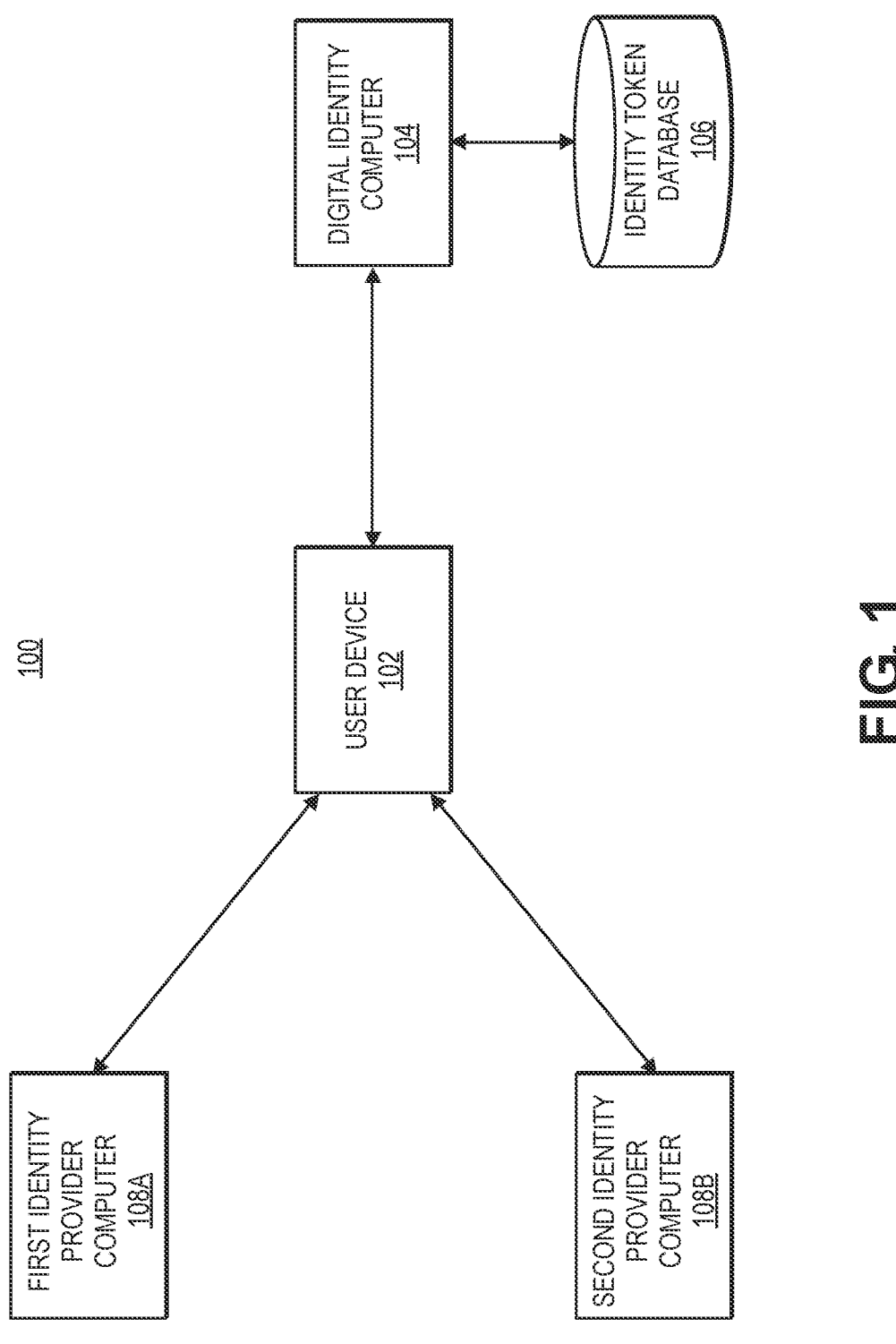
FIG. 1 shows a block diagram of an identity token system according to embodiments of the invention.

Prior to discussing embodiments of the disclosure, some terms can be described in further detail.

A "user" may include an individual or a computational entity. In some embodiments, a user may be associated with one or more personal accounts and/or mobile devices. The user may also be referred to as a cardholder, account holder, or consumer in some embodiments.

A "user device" may be any suitable device that a user can interact with (e.g., a payment card or mobile phone). User devices may be in any suitable form. Some examples of user devices include cellular phones, PDAs, personal computers (PCs), tablet computers, and the like. In some embodiments, where a user device is a mobile device, the mobile device may include a display, a memory, a processor, a computer-readable medium, and any other suitable component.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g., 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g., cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g., when a device has remote access to a network by tethering to another device—i.e. using the other device as a modem—both devices taken together may be considered a single mobile device).

An "attribute" can be or feature a quality or feature regarded as a characteristic or inherent part of someone or something. For example, three attributes associated with a user may be the name of the user, the birthday or the user, and an account number of the user.

A "identity token" can be a collection of data that can contain one or more attributes, and that can serve to identify or characterize a user. In some embodiments, an identity token includes a plurality of attributes. For example, an identity token for a user may comprise the name of the user, the birthday or the user, and an account number of the user. In some embodiments, an identity token may contain the same attribute multiple times. This can be the case if different identity providers provide the same attribute for the identity token. In this regard, an identity token may include a number of "sub identity tokens" (also referred to as "subtokens"). Each subtoken can be associated with a different identity provider.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 shows a block diagram of an identity token system 100 according to an embodiment of the invention. The identity token system 100 comprises a user (not shown in FIG. 1) operating a user device 102. In some embodiments, the user device 102 may be a mobile phone. The user device 102 may communicate with a first identity provider computer 108A, and a second identity provider computer 108B. The first identity provider computer 108A and the second identity provider computer 108B can populate identity attributes of an identity token. The first identity provider computer 108A may be operated by a first authorizing entity such as an issuer (e.g., a bank, a governmental agency, an educational institute such as a university, etc.), that knows identity attributes associated with the user operating the user device 102. The second identity provider computer 108B may be operated by a second authorizing entity. The second identity provider may be similar to or different then the first identity provider.

In some embodiments, the user device 102 may populate the identity token with the identity attributes received from the first identity provider computer 108A and the second identity provider computer 108B. The user operating the user device 102 may additionally provide identity attributes to be added to the identity token. After populating the identity token, the user device 102 may encrypt the identity token using a secret key stored in secure memory, and transmit the encrypted identity token to a digital identity computer 104.

In some embodiments, the digital identity computer 104 may be operated by a trusted entity and may be in communication with an identity token database 106. The digital identity computer 104 may store the identity token in onboard memory, or in the identity token database 106. The identity token database 106 may store identity tokens for a plurality of users. For example, the identity token database 106 may maintain accounts for the plurality of users, where the account stores the identity token associated with one user and wherein the account (an corresponding identity token) may be identified by an account identifier (e.g., a username set by the user, an account number generated by the digital identity computer 104, an e-mail address associated with the user, etc.).

The components in the identity token system 100 of FIG. 1 and any of the following figures can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); and Secure Hypertext Transfer Protocol (HTTPS).

Figure 2:
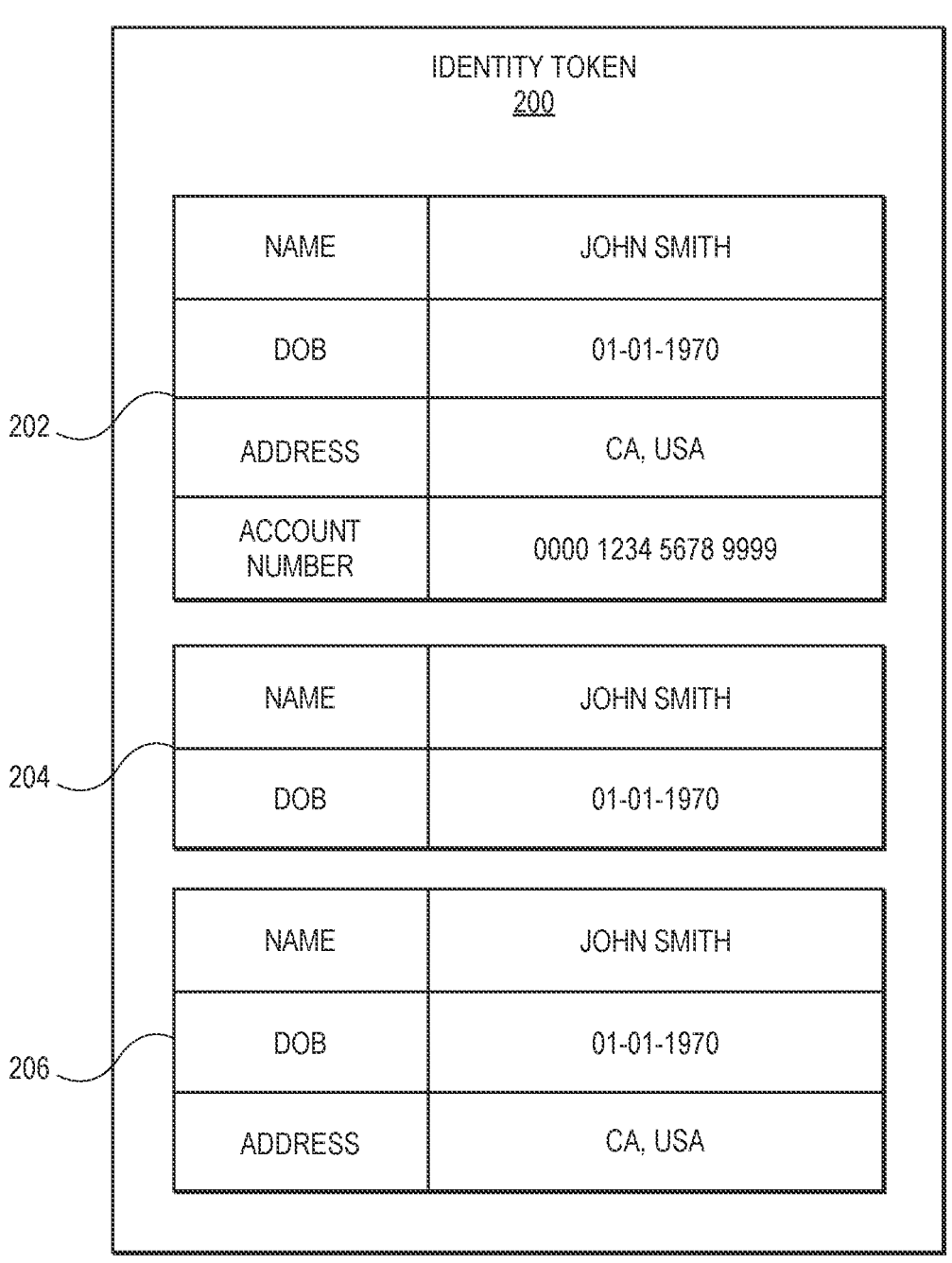
FIG. 2 shows an illustration of an exemplary identity token comprising a plurality of attributes associated with a user according to embodiments of the invention.

FIG. 2 shows an illustration of an exemplary identity token 200 comprising a plurality of attributes associated with a user according to embodiments of the invention. The identity token 200 comprises a plurality of attributes associated with a user. The identity token 200 illustrated in FIG. 2 may comprise a first sub-token 202, a second sub-token 204, and a third sub-token 206. The first sub-token 202 may comprise identity attributes provided by a first entity (e.g., the first identity provider computer 108A of FIG. 1), the second sub-token 204 may comprise identity attributes provided by a second entity (e.g., the second identity provider computer 108B of FIG. 1), and the third sub-token 206 may comprise identity attributes provided by a third entity (e.g., the user operating the user device 102 of FIG. 1). The identity attributes in one sub-token may or may not be the same as the identity attributes in another sub-token. For example, the first sub-token 202 may comprise a name "JOHN SMITH", a date of birth "Jan. 1, 1970", an address "CA, USA", and an account number "0000 1234 5678 9999". The second sub-token 204 may comprise the name "JOHN SMITH", and the date of birth "Jan. 1, 1970". The third sub-token 206 may comprise the name "JOHN SMITH", the date of birth "Jan. 1, 1970", and the address "CA, USA". The identity attributes in FIG. 2 are shown as plaintext, but the identity attributes may be encrypted before or after they are provided to a user device from an identity provider (e.g., the identity providers of FIG. 1, or the user operating the user device), and they may then be cached on the user device. The identity attributes may be decrypted using a secret key (e.g., a private key) stored on a user device (e.g., the user device 102 of FIG. 1).

The identity token illustrated in FIG. 2 includes actual data that can identify the user. In some embodiments, the identity token may comprise more general assertions about the user, instead of actual data about the user. For example, instead of an actual birthday date, the identity token may comprise an attribute such as "over 21" or "born after 1970" so that the user's actual identity data is not present in the identity token.

FIG. 3 shows a block diagram of an identity table 300 according to embodiments of the invention. The identity table 300 may correspond to the identity token 200 of FIG. 2. The identity table 300 lists the identity attributes in the identity token 200 in a column.

Each attribute may have a sensitivity level. The digital identity computer 104 may determine a platform defined sensitivity level by associating a score to different entity types and/or different circumstances. For example, if the user provides an identity attribute, and the identity attribute is not validated by any identity provider, the sensitivity level of the identity attribute may be set to "LEVEL 1". If at least one identity provider provides an identity attribute, the sensitivity level may be "LEVEL 2". If a multiple identity providers provide the same identity attribute, and at least one highly trusted entity (e.g., a governmental agency such as the DMV) provided the identity attribute, the sensitivity level may be "LEVEL 3". The platform defined sensitivity level $L_{sp}$ may be determined for a set of identity attributes in an identity token by assigning sensitivity coefficients (e.g., a set of numbers $w_1$, $w_2$, and $w_3$ such that $w_1+w_2+w_3=1$) to the sensitivity levels (e.g., a "LEVEL 1" identity attribute x may have a sensitivity coefficient of $w_1$, a "LEVEL 2" identity attribute y may have a sensitivity coefficient of $w_2$, and a "LEVEL 3" identity attribute z may have a sensitivity coefficient of $w_3$, such that the platform defined sensitivity level $L_{sp}$ is equal to $w_1x+w_2y+w_3z$). The example of FIG. 3 shows an example of three total platform defined sensitivity levels, however more or less than three sensitivity levels may be used.

Alternatively or additionally, the sensitivity level may be defined by the identity provider which provided the identity attribute. For example, the first identity provider computer 108A, which provided all identity attributes in the sub token 202, may determine a sensitivity level for the identity attribute "NAME" between zero and one (e.g., a sensitivity level $L_{s1}$ of 0.5). The second identity provider computer 108B may have assigned the same or different sensitivity level for the identity attribute "NAME" (e.g., the second identity provider may determine the sensitivity level $L_{s2}$ to be 0.3). In some embodiments, the average identity provider defined sensitivity level $L_{si}$ may then be determined for each identity attribute in the identity table 300 (e.g., an average identity provider defined sensitivity level of $$\sum_{i=1}^{2} \frac{L_{si}}{2} = (0.5 + 0.3)/2 = 0.4$$

for the identity attribute "NAME").

Alternatively or additionally, a user defined sensitivity level may be defined by the user in a similar manner to the identity provider defined sensitivity level. The user may assign a sensitivity level for the identity attribute "NAME", also between zero and one (e.g., the user may set the sensitivity level $L_{sc}$ of the identity attribute "NAME" to be 0.1).

In some cases, the rarity of the identity attribute may be determined by the digital identity computer 104. For example, the digital identity computer 104 may determine how many times the specific attribute appears in the identity token 200. For example, the attribute "NAME" with value "JOHN SMITH" appears in all three sub-tokens of the identity token 200. Thus, the digital identity computer 104 may determine that the relative rarity is "LOW". Similarly, the attribute "ACCOUNT NUMBER" with value "0000 1234 5678 9999" only appears in the first sub-token 202, and so the relative rarity of the attribute is "HIGH". More formally, let the frequency of each identity attribute k in the population of identity tokens be $f_k$. The rarity $L_{rk}$ corresponding to the attribute k can be defined as follows:

$$L_{rk} = 1 - f_k \bigg/ \sum_{k=1}^{n} f_k,$$

where there are n total identity attributes in the identity token. For an identity token with n total identity attributes, the average rarity of the attributes can be computed as $$L_r = \sum_{k=1}^{n} L_{rk} / n.$$

The rarity level can be specific to an attribute with a specific value. For example, there could be another account number with a different value in the identity token 200, which may have a different relative rarity.

The identity table 300 may be used in conjunction with an access request to determine an authentication score, and an associated set of authentication mechanisms required to complete the access request. For example, the user may select a set of identity attributes that are required for the access request. A combination of the sensitivity level and relative rarity of the set of identity attributes may be used to determine the authentication score $L_a$. For example the following equation may be used:

$$L_{ac} = \alpha L_{sp} + \beta L_{si} + \gamma L_{sc} + \Delta L_r$$

Where $\alpha$, $\beta$, $\gamma$, and $\Delta$ are normalization factors (e.g., a set of coefficients that set $L_{ac}$ to be between 0 and 1), $L_{sp}$ is a platform defined level of sensitivity determined by the digital identity computer (e.g., the sensitivity determined by what entity, and how many entities provided the identity attribute), $L_{si}$ is an identity provider defined level of sensitivity determined by the identity provider (e.g., the identity provider may assign a "LEVEL 1" for the "NAME" attribute it provided), $L_{sc}$ is a user defined level of sensitivity (e.g., the user may assign a "LEVEL 1" for the "NAME" attribute it provided), and $L_r$ is a level of rarity (e.g., the relative rarity of the identity attribute). The digital identity computer may then use the authentication score $L_{ac}$ to determine an authentication process. In some embodiments, a mapping table (shown below) may be used to store authentication processes. For example, the mapping table may determine that an authentication score between 0 and 0.3 require any two factors (e.g., OTP, biometric, password, etc.), an authentication score between 0.3 and 0.6 requires two factors with a mandatory biometric, an authentication score between 0.6 and 0.8 requires three factors with a mandatory biometric, etc.

TABLE 1

| Authentication Score | Authentication Process |
|---|---|
| L__ac > 0 & L__ac <= 0.3 | Standard two factor - any factors |
| L__ac > 0.3 & L__ac <= 0.6 | Two factors with mandatory biometrics |
| L__ac > 0.6 & L__ac <= 0.8 | Three factors (two factor + OTP) |
| . . . | . . . |

Although the $L_{ac}$ may be based on the sensitivity levels of the user, the platform and the identity providers in the above description, it is understood that the value $L_{ac}$ could be based on one or two of the sensitivity levels, instead of all three.

Figures 4, 5:
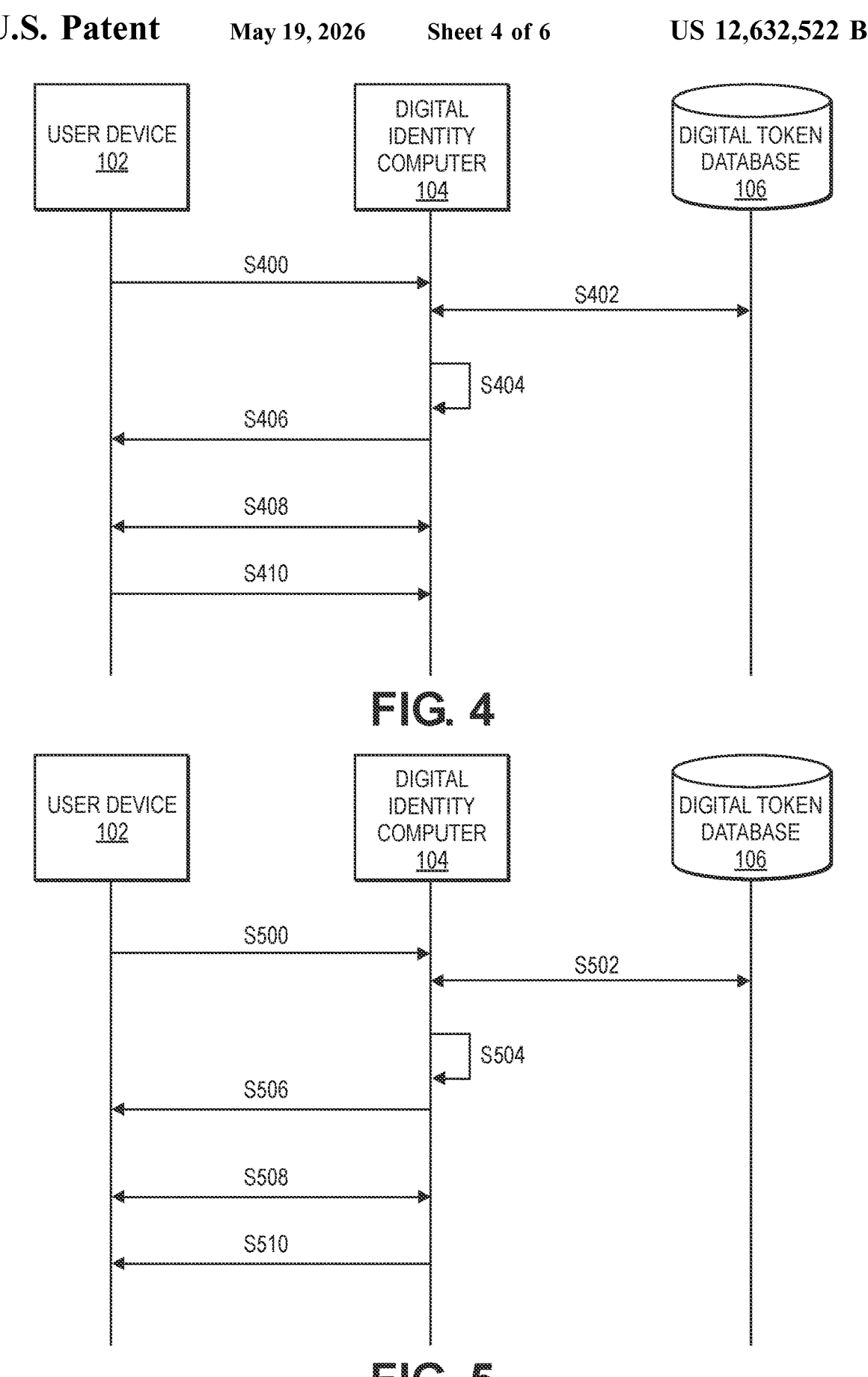
FIG. 4 shows a flow diagram of a user device performing a recovery request with a digital identity computer according to embodiments of the invention.
FIG. 5 shows a flow diagram of a user device performing an access request with a digital identity computer according to embodiments of the invention.

FIG. 4 shows a flow diagram of a user device 102 performing a recovery request with a digital identity computer 104 according to embodiments of the invention. The user device 102 may be operated by a user. The user may wish to recover an account, and indicate a number of identity attributes required to recover the account. The user device 102 may have provided an identity token to the digital identity computer 104, where the identity token comprising a plurality of identity attributes that may be used to recover the account.

In step S400, the user operating the user device 102 may input a recovery request to the user device 102 by selecting one or more identity attributes to recover. The recovery request may be an example of an resource request. For example, the user may input "NAME", "ACCOUNT NUMBER", and "DATE OF BIRTH" into the user device 102. The user device 102 may then transmit the recovery request to the digital identity computer 104. The recovery request may further comprise a user identifier (e.g., IP address, username, etc.) associated with the user device 102.

In step S402, after receiving the recovery request from the user device 102, the digital identity computer 104 may retrieve the identity token associated with the user from the identity token database 106. The user identifier may be used to identify the correct identity token required.

In step S404, after retrieving the identity token of the user, the digital identity computer 104 may determine an authentication score. The authentication score may be determined from the one or more identity attributes transmitted by the user device 102 in step S400. For example, if the identity attributes selected were "NAME", "ACCOUNT NUMBER" and "DATE OF BIRTH", the digital identity computer 104 may determine the authentication score from the sensitivity levels and the relative rarities of the identity attributes in the identity token or in the associated identity table. After determining the authentication score, the digital identity computer 104 may then determine an authentication process from the authentication score. In some embodiments, the digital identity computer 104 may use a mapping table to determine the authentication process. For example, the mapping table may store a plurality of authentication processes, and may take as input an authentication score to determine one authentication process from the plurality of authentication processes. Examples of an authentication process include one or more of a one-time password, a biometric authentication, a password, providing a hardware security key, etc.

In step S406, after determining the authentication process to execute the recovery request, the digital identity computer 104 may transmit instructions to complete the authentication process to the user device 102.

In step S408, after receiving instructions to complete an authentication process from the digital identity computer 104, the user device 102 may execute the authentication process with the digital identity computer 104. For example, if the authentication process is a two-factor authentication with a biometric authentication, and a one-time password, the user device 102 may transmit the biometric and one-time password to the digital identity computer 104.

In step S410, after completing the authentication process, the user may have then recovered their account, and may have been provided with a chance to reset any access credentials (e.g., re-set a password). The user (using the user device 102) may also be allowed to generate a new public-private key pair to re-set the account. In such cases, the new public key may be stored at the digital identity computer 104 and the private key (or secret key) may be stored in the user device 102. The new public key may be used to encrypt any attributes of the identity token before they are transmitted to an external device by the digital identity computer 104. In some embodiments, the recover request may be for the secret or private key that was used to encrypt the identity token. This can be the case if the private key was also stored at the digital identity computer.

In embodiments of the invention, there can be a number of possibilities. In some cases, one can recover the key/key pair used by identity providers to encrypt the attributes. In other embodiments, one can generate new key/key pair and request identity providers to encrypt attributes using this new key/key pair and furnish them to the digital identity computer.

After the user is allowed to access the account, the user device 102 may request the identity attributes from the digital identity computer 104. In response, the digital identity computer 104 may transmit the appropriate identity attributes to the user device 102 to continue processing the resource request. In some embodiments, the identity attributes may have been encrypted with the newly created public key of the user device 102. The user device 102 could then decrypt the attributes and can then provide them to a relying party (e.g., a merchant) who may need to see the attributes to determine if the user can perform a certain action.

FIG. 5 shows a flow diagram of a user device performing an access request with a digital identity computer according to embodiments of the invention. The access request may be an example of a resource request. The access request may be a request to access a resource such as data (e.g., identity attribute data), a secure location (e.g., a secure building) etc.

In step S500, the user operating the user device 102 may input an access request to the user device 102 by selecting one or more identity attributes required. The access request may be a request to access an age restricted resource (e.g., purchasing alcohol through an online marketplace). For example, the user may input "NAME" and "DATE OF BIRTH" into the user device 102. The user device 102 may then transmit the access request to the digital identity computer 104. The access request may further comprise an user identifier (e.g., IP address, username, etc.) associated with the user device 102.

In step S502, after receiving the access request from the user device 102, the digital identity computer 104 may retrieve the identity token associated with the user from the identity token database 106. The user identifier may be used to identify the correct identity token required.

In step S504, after retrieving the identity token of the user, the digital identity computer 104 may determine an authentication score. The authentication score may be determined from the one or more identity attributes transmitted by the user device 102 in step S500. For example, if the identity attributes selected were "NAME" and "DATE OF BIRTH", the digital identity computer 104 may determine the authentication score from the sensitivity levels and the relative rarities of the identity attributes in the identity token or in the associated identity table (as described above). After determining the authentication score, the digital identity computer 104 may then determine an authentication process from the authentication score.

In step S506, after determining the authentication process to execute the access request, the digital identity computer 104 may transmit instructions to complete the authentication process to the user device 102.

In step S508, after receiving instructions to complete an authentication process from the digital identity computer 104, the user device 102 may execute the authentication process with the digital identity computer 104. For example, if the authentication process is a one-factor authentication with a one-time password, the user device 102 may transmit the one-time password to the digital identity computer 104.

In step S510, after completing the authentication process, the digital identity computer 104 may process the access request by providing access to the resource to complete the access request. In some embodiments, the digital identity computer 104 may provide the identity attributes to the user device 102, so that the user device 102 may use the identity attributes to gain access to the resource. In some embodiments, the identity attributes may be sent as assertions (e.g., instead of date of birth, the digital identity computer 104 may send "OVER 21").

Embodiments of the invention provide for a number of advantages. Embodiments of the invention can allow a user to aggregate identity attributes into an identity token. The identity token can be used to perform resource requests to gain access to a resource. The user may indicate one or more identity attributes in the identity token required to complete the resource request with a digital identity computer. The digital identity computer can then determine an authentication score from the one or more identity attributes indicated by the user, and determine an authentication process required to access the identity attributes. The level of security is determined by a sensitivity level and a rarity level of the identity attributes indicated by the user. For example, if the resource request is a simple request to access the name and date of birth of a user, the authentication score may be low and the associated authentication process may be simple and only require a password guess, one-time password, or other easy to complete authentication process. However, if the resource request is a request to access a bank account number, the authentication score may be high and require the user to complete a more secure authentication process. Additionally, the user is not required to hold different cards (e.g., government IDs, library cards, employee cards, etc.) and can simply use the identity token to complete resource requests. In embodiments of the invention, the user's data can be protected, and if the user somehow loses access to their account, gaining access to the account or specific attributes in the account is not overly burdensome and is specifically tailored towards the specific attribute data that is to be accessed.

Figure 6:
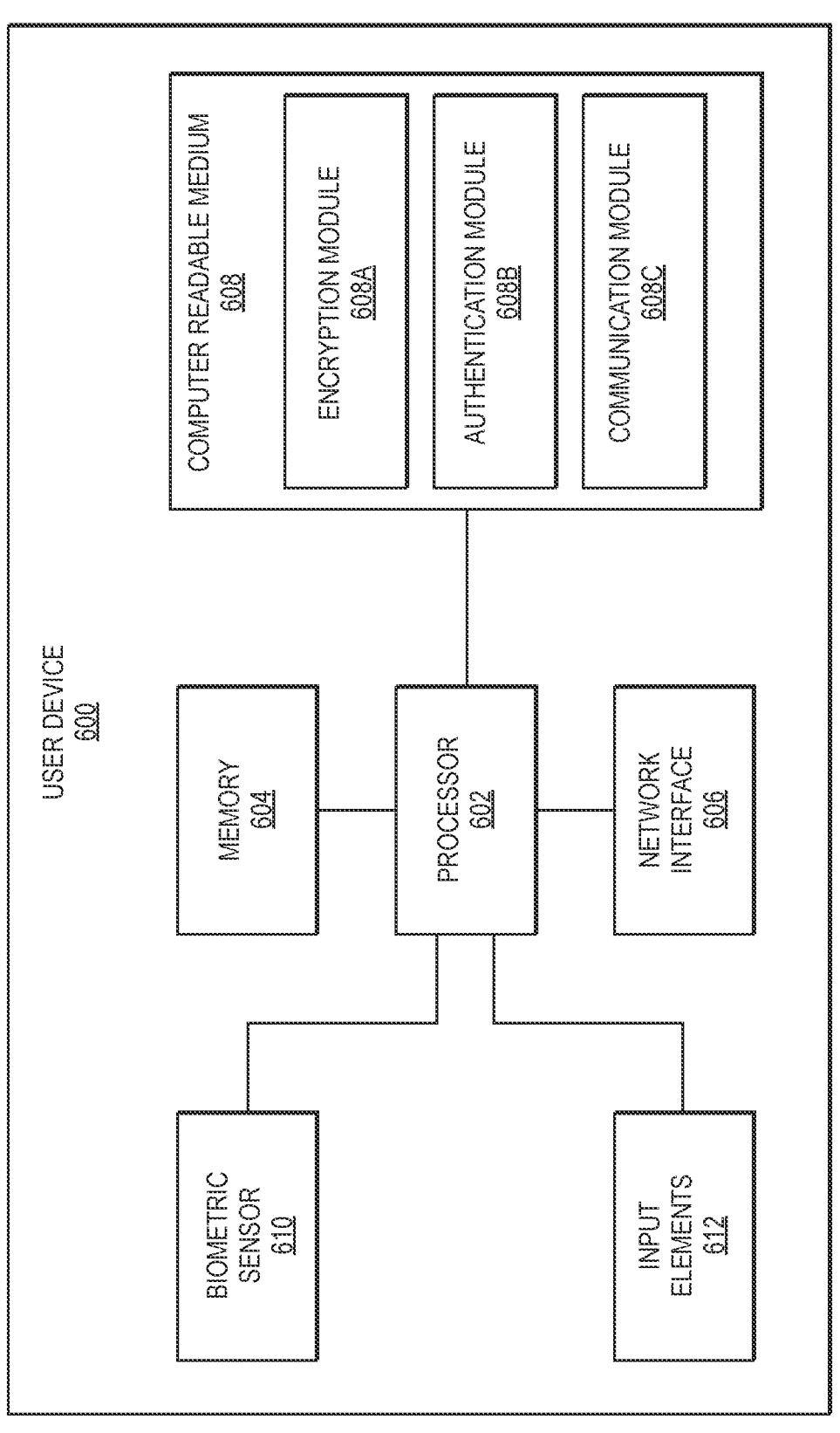
FIG. 6 shows a block diagram of a user device according to embodiments of the invention.

FIG. 6 shows a block diagram of a user device 600 according to embodiments of the invention. The user device 600 may be operated by a user. The user device 600 may be used to populate identity attributes in an identity token, and to complete resource requests. The user device 600 may comprise a processor 602. The processor 602 may be coupled to a memory 604, a network interface 606, a computer readable medium 608, a biometric sensor 610, and input elements 612. The computer readable medium 608 may comprise any suitable number and types of software modules.

The memory 604 may be used to store data and code. The memory 604 may be coupled to the processor 602 internally or externally (e.g., via cloud based data storage), and may comprise any combination of volatile and/or non-volatile memory such as RAM, DRAM, ROM, flash, or any other suitable memory device. In some embodiments, the memory 604 may store a secret key unique to the user device 600 used to encrypt identity tokens.

The network interface 606 may include an interface that can allow the user device 600 to communicate with external computers. The network interface 606 may enable the user device 600 to communicate data to and from another device such as an a digital identity computer, an identity provider computer, etc. Some examples of the network interface 606 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 606 may include Wi-Fi™. Data transferred via the network interface 606 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 606 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 608 may comprise code, executable by the processor 602, for a method comprising: transmitting, by a user device operated by a user to a digital identity computer, a resource request, wherein the digital identity computer determines an authentication process for the resource request by determining an authentication score based on sensitivity scores and rarity scores for an identity token comprising attributes associated with the user; receiving, by the user device from the digital identity computer, instructions to complete the authentication process; and executing, by the user device, the authentication process.

The computer readable medium 608 may comprise a number of software modules including, but not limited to, an encryption module 608A, an authentication module 608B, and a communication module 608C.

The encryption module 608A may comprise code that causes the processor 602 to encrypt and decrypt data. The encryption module 608A, in conjunction with the processor 602, may generate encryption key pairs. The encryption keys may be used to encrypt and decrypt identity tokens.

The authentication module 608B may comprise code that causes the processor 602 to complete authentication processes. The authentication module 608B may be in communication with the biometric sensor 610 and input elements 612 to complete authentication processes. For example, a two-factor authentication with a biometric and a one-time password may be handled by the authentication module 608B. The authentication module 608B may prompt the user operating the user device 600 to provide a biometric using the biometric sensor 610, and input a one-time password using the input elements 612.

The communication module 608C, in conjunction with the processor 602, can generate messages, forward messages, reformat messages, and/or otherwise communicate with other entities. For example, communication module 608C can be used to facilitate communications between the user device 600 and an digital identity computer, an identity provider computer, etc. The communication module 608C may generate and verify communications between the user device 600 and external devices.

The biometric sensor 610 and input elements 612 may be used to receive data from a user. Examples of the biometric sensor 610 may be a camera, a microphone, a fingerprint sensor, etc. Input elements 612 may be a touchscreen, a keypad, a microphone, etc.

Figure 7:
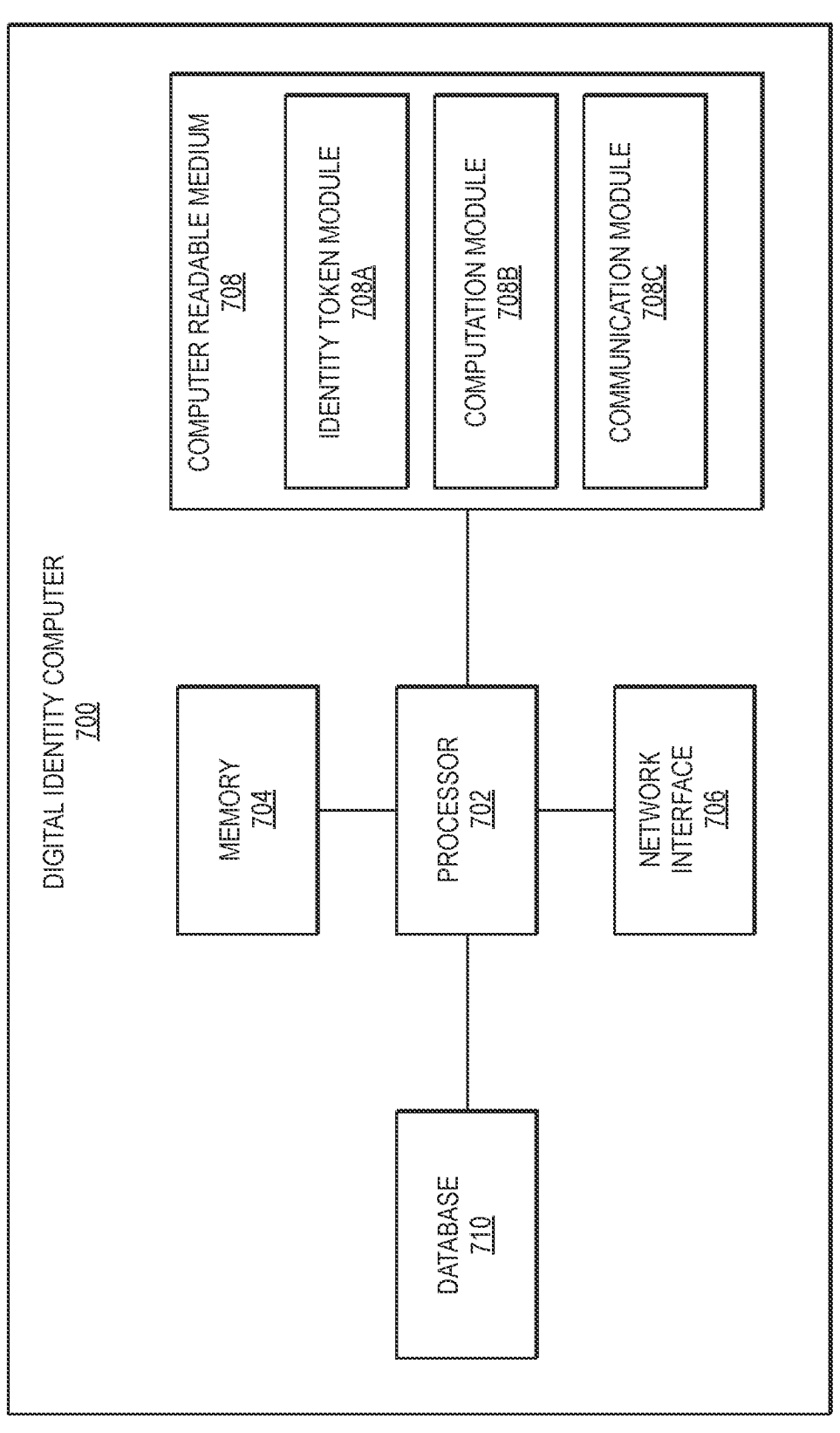
FIG. 7 shows a block diagram of a digital identity computer according to embodiments of the invention.

FIG. 7 shows a block diagram of a digital identity computer 700 according to embodiments of the invention. The digital identity computer 700 may be operated by a trusted entity such as a processing network (e.g., a payment processing network), a governmental agency, etc. The digital identity computer 700 may comprise a processor 702. The processor 702 may be coupled to a memory 704, a network interface 706, a computer readable medium 708, and a database 710. The computer readable medium 708 may comprise any suitable number and types of software modules.

The memory 704 may be used to store data and code. The memory 704 may be coupled to the processor 702 internally or externally (e.g., via cloud based data storage), and may comprise any combination of volatile and/or non-volatile memory such as RAM, DRAM, ROM, flash, or any other suitable memory device.

The network interface 706 may have the same or different features to the previously described network interface 606.

The computer readable medium 708 may comprise code, executable by the processor, for a method comprising: receiving, by a digital identity computer from a user device operated by a user, a resource request; retrieving, by the digital identity computer, an identity token comprising a plurality of attributes associated with the user; determining, by the digital identity computer, an authentication score based on at least sensitivity scores and rarity scores for the attributes in the identity token; determining, by the digital identity computer, an authentication process from a plurality of authentication processes using the authentication score; in response to determining the authentication process, executing, by the digital identity computer, the authentication process with the user; and after authenticating the user, continuing processing the resource request.

The computer readable medium 708 may comprise a number of software modules including, but not limited to, an identity token module 708A, a computation module 708B, and a communication module 708C.

The identity token module 708A may comprise code that causes the processor 702 to manage identity tokens. For example, the identity token module 708A may receive an identity token from a user device and store the identity token in the database 710. The identity token module 708A may identify identity tokens in the database 710 using user identifiers. The identity token module 708A may determine sensitivity levels and rarity levels associated with identity attributes in an identity token.

The computation module 708B may comprise code that causes the processor 702 to perform computations. For example, the computation module 708B may determine authentication scores from identity attributes in an identity token.

The communication module 708C, in conjunction with the processor 702, can generate messages, forward messages, reformat messages, and/or otherwise communicate with other entities. For example, communication module 708C can be used to facilitate communications between the digital identity computer 700 and a user device, etc. The communication module 708C may generate and verify communications between the user device 700 and external devices.

The database 710 may be an identity token database. The database 710 may store and manage identity tokens associated with a plurality of users. The database 710 may manage accounts, that hold identity tokens, identified by a user identifier.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
receiving, by a digital identity computer from a user device operated by a user, a resource request;
retrieving, by the digital identity computer, an identity token of the user comprising a plurality of attributes associated with the user;
determining, by the digital identity computer, an authentication score based on at least sensitivity scores and rarity scores for the attributes in the identity token, each rarity score based on a frequency of an attribute of the attributes in the identity token, and the rarity scores and the sensitivity scores being in an identity table that also has attribute names and corresponding attribute values associated with the rarity scores and the sensitivity scores;
determining, by the digital identity computer, an authentication process from a plurality of authentication processes using the authentication score;
in response to determining the authentication process, executing, by the digital identity computer, the authentication process with the user; and
after authenticating the user, continuing processing the resource request.

2. The method of claim 1, wherein the identity token is encrypted with a secret key unique to the user and the resource request is a recovery request for the secret key.

3. The method of claim 1, wherein the plurality of attributes are added to the identity token by the user device and a plurality of identity provider computers, and wherein the user device and/or the plurality of identity provider computers determine a sensitivity score for the attributes upon adding the attributes to the identity token.

4. The method of claim 1, wherein the resource request is an account recovery request.

5. The method of claim 1, wherein the authentication process comprises one or more authentication factors.

6. The method of claim 1, wherein determining the authentication process from the plurality of authentication processes comprises accessing the identity table.

7. The method of claim 1, wherein the resource request is an access request, and processing the access request comprises transmitting one or more of the attributes in the identity token.

8. The method of claim 1, wherein the authentication process comprises a biometric authentication.

9. The method of claim 1, wherein the identity token is stored in an identity token database.

10. The method of claim 1, wherein the sensitivity scores for the attributes in the identity token comprise one or more of a platform sensitivity, an identity provider sensitivity, and a user sensitivity.

11. The method of claim 1, wherein the user device operated by the user is a mobile device.

12. The method of claim 1, wherein the digital identity computer is operated by a processing network.

13. The method of claim 1, wherein the plurality of attributes associated with the user comprise data of the user and data of accounts held by the user.

14. The method of claim 1, wherein continuing processing the resource request comprises allowing the user device to generate a new public-private key pair, storing a public key of the new public-private key pair.

15. A digital identity computer comprising:
a processor; and
a non-transitory computer readable medium comprising code executable by the processor for performing a method comprising:
receiving, by the digital identity computer from a user device operated by a user, a resource request;
retrieving, by the digital identity computer, an identity token of the user comprising a plurality of attributes associated with the user;
determining, by the digital identity computer, an authentication score based on at least sensitivity scores and rarity scores for the attributes in the identity token, each rarity score based on a frequency of an attribute of the attributes in the identity token, and the rarity scores and the sensitivity scores being in an identity table that also has attribute names and corresponding attribute values associated with the rarity scores and the sensitivity scores;
determining, by the digital identity computer, an authentication process from a plurality of authentication processes using the authentication score;
in response to determining the authentication process, executing, by the digital identity computer, the authentication process with the user; and
after authenticating the user, continuing processing the resource request.

16. The digital identity computer of claim 15 further comprising an identity token database which stores identity tokens for a plurality of users, and wherein the identity token is retrieved from the identity token database.

17. The digital identity computer of claim 15, wherein the authentication process comprises one or more authentication gestures including a biometric authentication, a password authentication, or a device authentication.

18. A method comprising:
transmitting, by a user device operated by a user to a digital identity computer, a resource request, wherein the digital identity computer is programmed to determine an authentication process for the resource request by determining an authentication score based on sensitivity scores and rarity scores for an identity token of the user comprising attributes associated with the user, each rarity score based on a frequency of an attribute of the attributes in the identity token, and the rarity scores and the sensitivity scores being in an identity table that also has attribute names and corresponding attribute values associated with the rarity scores and the sensitivity scores;

receiving, by the user device from the digital identity computer, instructions to complete the authentication process; and executing, by the user device, the authentication process.

19. The method of claim 18, wherein the resource request is a recovery request to allow the user to access the identity token or attributes of the identity token.

20. The method of claim 18, wherein the user device is a mobile device.

\* \* \* \* \*